United States Patent
Hedayat et al.

(10) Patent No.: US 6,788,048 B2
(45) Date of Patent: Sep. 7, 2004

(54) POSITION SENSOR WITH REDUCTION GEAR TRAIN

(75) Inventors: Kayvan Hedayat, Weston, MA (US); Gerald Tromblee, Hanover, MA (US); Norman Poirier, Raynham, MA (US)

(73) Assignee: Stoneridge Control Devices Inc., Canton, MA (US)

( * ) Notice: Subject to any disclaimer, the term of this patent is extended or adjusted under 35 U.S.C. 154(b) by 0 days.

(21) Appl. No.: 10/268,623

(22) Filed: Oct. 10, 2002

(65) Prior Publication Data

US 2003/0080734 A1 May 1, 2003

Related U.S. Application Data

(60) Provisional application No. 60/328,165, filed on Oct. 10, 2001.

(51) Int. Cl.[7] .............................. G01B 7/14; G01B 7/30; G01R 35/00; F16H 29/20
(52) U.S. Cl. ............. 324/202; 324/207.24; 324/207.25; 74/89.14
(58) Field of Search ................. 324/202, 207.2–207.25; 74/89.11–89.17; 248/429; 297/330; 318/286, 466–470, 626; 310/68 B

(56) References Cited

U.S. PATENT DOCUMENTS

| 5,886,517 A | * | 3/1999 | Reichmann et al. ...... 324/207.2 |
| 6,055,877 A | * | 5/2000 | Welterlin et al. ............ 74/89.5 |
| 6,288,534 B1 | * | 9/2001 | Starkweather et al. ... 324/207.2 |
| 6,400,141 B1 | * | 6/2002 | Apel et al. ............... 324/207.2 |
| 6,563,305 B1 | * | 5/2003 | Sorsa et al. .............. 324/207.2 |

FOREIGN PATENT DOCUMENTS

JP    2001-349703    * 12/2001

* cited by examiner

Primary Examiner—N. Le
Assistant Examiner—Reena Aurora
(74) Attorney, Agent, or Firm—Grossman Tucker Perreault & Pfleger, PLLC

(57) ABSTRACT

A position sensor including: a reduction gear train having an input gear and an output gear. The input gear is configured for coupling to an output shaft of a drive motor for driving a vehicle seat on an associated seat track, and a magnet disposed on the output gear for rotation therewith. A Hall Effect sensor is disposed adjacent the magnet for providing a sensor output signal in response to rotation of the magnet. A lock out mechanism for a position sensor, a method of sensing the position of a vehicle seat, and a method of calibrating a vehicle seat position sensor are also provided.

13 Claims, 5 Drawing Sheets

US 6,788,048 B2

POSITION SENSOR WITH REDUCTION GEAR TRAIN

CROSS REFERENCE TO RELATED APPLICATIONS

This application claims the benefit of the filing date of U.S. Provisional Application Ser. No. 60/328,165, filed Oct. 10, 2001, the teachings of which are incorporated herein by reference.

FIELD OF THE INVENTION

The present invention relates generally to position sensing, and, in one embodiment, to a non-contact absolute position sensor for sensing the position of an automobile seat along a seat track.

BACKGROUND OF THE INVENTION

In a wide variety of applications it is advantageous or necessary to sense the position of a linearly or rotationally movable element. For example, in automobile seat applications the seat may be linearly movable, either manually or automatically via electro-mechanical means, on an associated track assembly. A sensor may provide a signal representative of the linear position of the seat on the track for a variety of purposes, e.g. to control deployment of an air bag, to control the electro-mechanical actuator that causes translation of the seat in connection with a seat position memory feature, etc.

For a seat position application, it is increasingly desirable for a sensor to provide multiple position outputs for purposes of ascertaining occupant position. For example, in applications where seat position is used to control air bag deployment early configurations involved only single stage air bag systems. A single stage air bag deploys with a known deployment force that may not be varied. In this application, seat position information was used only to determine when the airbag should be deployed.

However, the advent of dual stage air bags, i.e. air bags that may be deployed with two distinct deployment forces, has necessitated increased resolution in position sensing. Also, the industry is now moving to variable stage airbags where the deployment force may be varied depending upon occupant position and classification. Variable stage airbag configurations will require a sensor that can detect multiple seat positions for use in determining the appropriate deployment force.

Known automobile seat position sensors, however, provide outputs associated with only a limited number, e.g. two, seat positions. In addition, many conventional seat position sensor configurations utilize contacting technology, e.g. resistive or wiper contact configurations, and are thus mechanically coupled to the seat track mechanism. This mechanical coupling tends to generate undesirable noise and system wear.

Also, when such sensors are assembled to a seat track, sensor calibration is not reliable. Where the sensor is used for airbag deployment, proper system operation and, indeed, the safety of vehicle passengers, depends on accurate sensor calibration. Moreover, existing configurations present difficulties when a sensor malfunction occurs. To replace such a sensor, the entire track assembly must be discarded to avoid the possibility that the dealer would improperly assemble or calibrate the sensor.

There is thus a need for a reliable sensor for providing an output associated with multiple positions of a vehicle seat along a seat track. There is a further need in the art for a seat track position sensor that may be properly calibrated in a simple manner and efficient manner.

SUMMARY OF THE INVENTION

According to one aspect of the invention, there is provided a position sensor including: a reduction gear train having an input gear and an output gear. The input gear is configured for coupling to an output shaft of a drive motor for driving a vehicle seat on an associated seat track, and a magnet disposed on the output gear for rotation therewith. A Hall Effect sensor is disposed adjacent the magnet for providing a sensor output signal in response to rotation of the magnet. The Hall sensor may be a linear Hall sensor for providing a linear output proportional to the number of revolutions of the drive shaft and, hence, the position of the seat on the seat track.

According to another aspect of the invention there is provided a lock out mechanism for a position sensor. The mechanism includes a housing defining an opening for receiving an output shaft of a drive motor for driving a vehicle seat on an associated seat track and a lock out arm biased toward the opening. The lockout arm is configured to move over the opening upon removal of the output shaft from the opening, thereby preventing reinsertion of the output shaft into the opening.

According to further aspects of the invention there is also provided a method of sensing the position of a vehicle seat and a method of calibrating a vehicle seat position sensor.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

An exemplary sensor consistent with the invention will now be described in connection with exemplary embodiments thereof. It is to be understood that illustrated exemplary embodiments described herein are provided only by way of illustration, and are not intended to be limiting.

Figure 1:
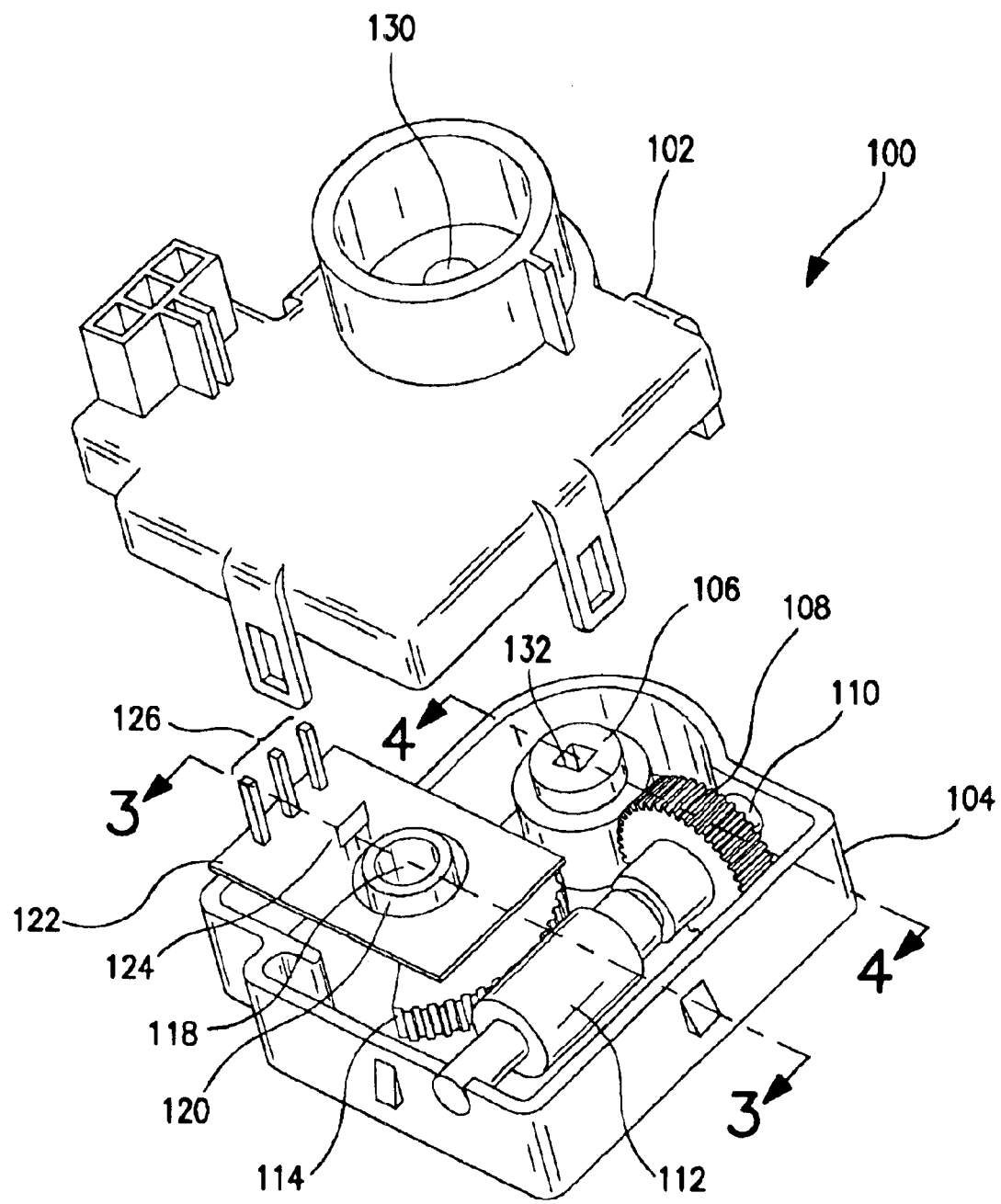
FIG. 1 is a perspective view of an exemplary sensor consistent with the invention showing the sensor cover removed.
Figure 3:
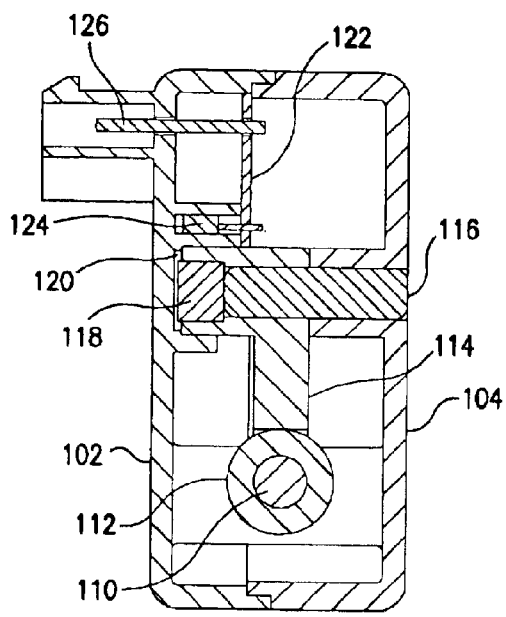
FIG. 3 is an end sectional view taken along lines 3—3 in FIG. 1.
Figure 4:
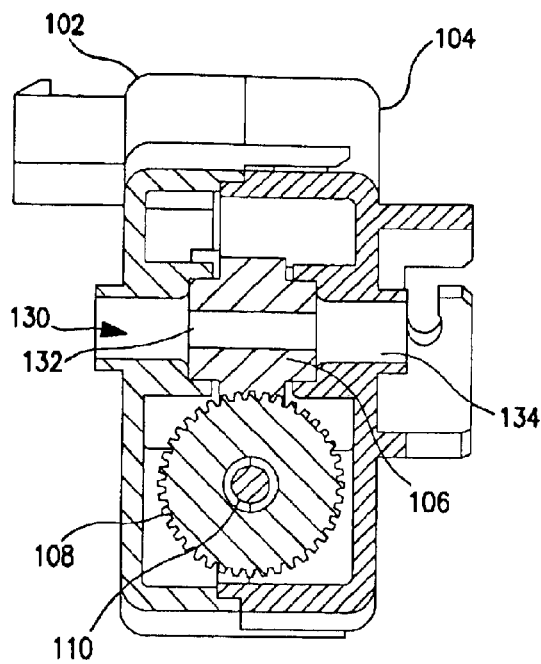
FIG. 4 is an end sectional view taken along lines 4—4 in FIG. 1.
Figure 2:
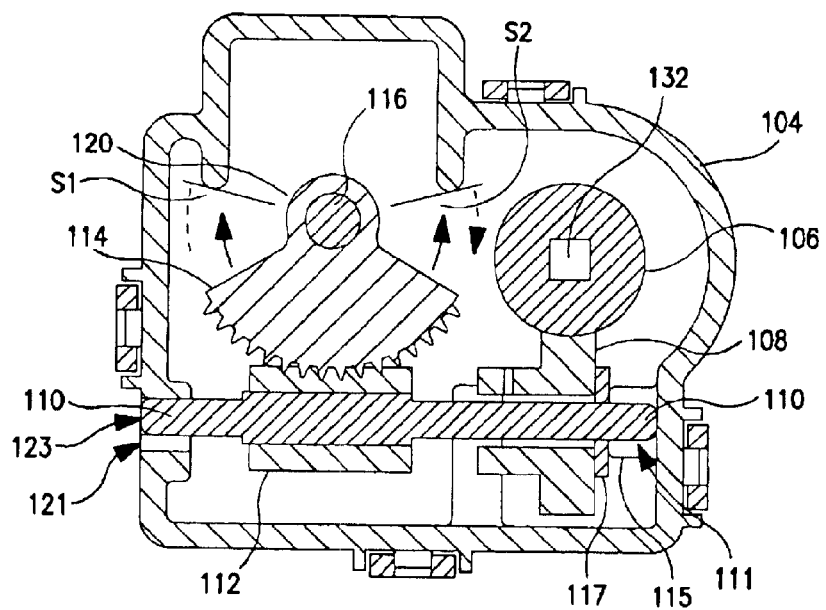
FIG. 2 is a side sectional view of the sensor illustrated in FIG. 1.

Turning to FIG. 1, there is illustrated in perspective view one exemplary embodiment of a sensor system 100 consistent with the invention wherein a top cover 102 of the system is shown in exploded view relative to other system components. With reference also to FIGS. 2–4, the system 100 includes a housing having a casing 104 and a cover 102. Disposed in the housing are a pinion gear 106, a worm wheel 108 in meshing engagement with the pinion gear and affixed to a flexible shaft 110 that is supported by the housing for rotation, a worm gear 112 fixed to the flexible shaft, a sector gear 114 in meshing engagement with the worm gear and disposed for rotation about a post 116 in the housing, a magnet 118 disposed at the end of the axle 120 of the sector gear, and a printed circuit board (PCB) 122 including a linear Hall Effect Sensor 124 and associated circuitry for providing a linear output representative of seat track position to one of a number of pins 126.

Figure 5:
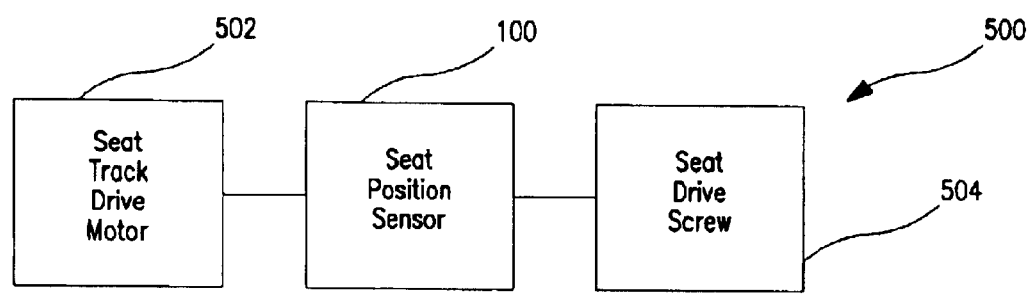
FIG. 5 is block diagram illustrating connection of a sensor consistent with the invention in a seat track drive system.

In one embodiment, as shown for example in FIG. 5, the system 100 may be installed in a seat track drive system 500 directly between the seat track drive motor 502 and the seat drive screw 504. In this configuration, the motor output shaft may be a square drive shaft that transmits torque to the drive screw through the sensor system. In one embodiment, the motor shaft may enter the system cover 102 through an associated opening 130 defined therein and then pass through a square drive opening 132. The end of the motor shaft extending out of the casing 104 through opening 134 may then be affixed to the seat track drive screw.

In the illustrated exemplary embodiment, the pinion gear 106, worm wheel 108, shaft 110, worm gear 112, and sector gear 114 form a reduction gear train for reducing the motor output revolutions to corresponding rotation in the sector gear. The magnet 118 may be positioned in the final gear of the reduction gear train, e.g. the sector gear 114 in the illustrated exemplary embodiment, in such a manner to minimize the height of the sensor. The Hall sensor 124 is mounted on the PCB, adjacent the rotating magnet so that flux from the magnet is imparted to the Hall sensor. Those skilled in the art will recognize that the magnet may be positioned on an intermediate gear, e.g. the worm gear 112, depending on the application and the range of seat movement to be sensed. Also, the Hall sensor may be mounted adjacent the magnet in a variety of ways, and need not necessarily be directly mounted to a PCB.

The reduction gear train is preferably configured so that the rotation of the last reduction gear, e.g. the sector gear in the illustrated embodiment, and the magnet affixed thereto is less than 360 degrees for the entire fore and aft range of the seat. As shown in FIG. 2, for example, the sector gear 114 rotates less than 360 degrees between first S1 and second S2 stop positions with movement of the seat between its extreme fore and aft positions. As the sector gear rotates, the magnetic flux imparted to the Hall sensor 124 by the magnet 118 varies.

The Hall sensor 124 provides a linear output representative of the magnetic flux imparted thereon and proportional to the number of turns of the motor output shaft. In an embodiment, as illustrated, wherein the rotation of the sector gear and magnet for the entire fore and aft range of motion for the seat is less than 360 degrees, the Hall sensor 124 advantageously provides an absolute unambiguous seat position signal. By knowing the seat position travel associated with a turn of the motor output shaft, the position of the seat on the track may be calculated from the linear output of the Hall device.

Figure 6:
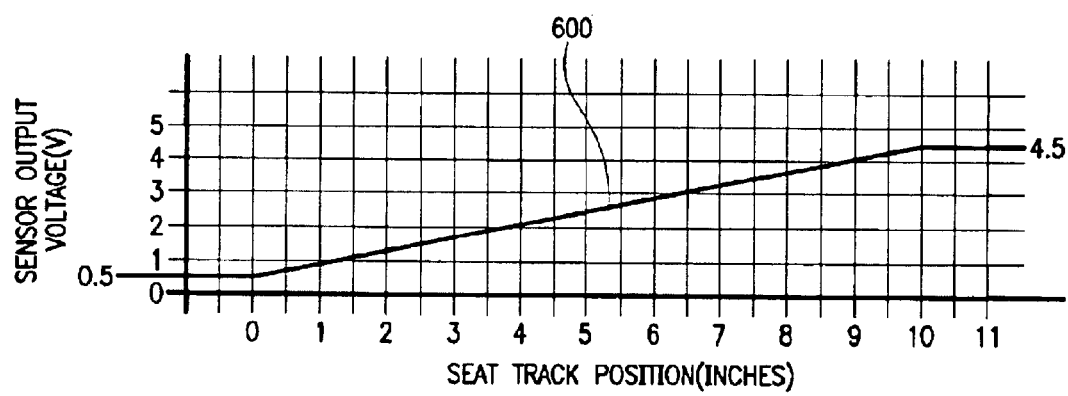
FIG. 6 is a plot of sensor output voltage vs. seat track position associated with a sensor incorporating circuit illustrated in FIG. 6.

FIG. 6 for example is an exemplary plot 600 of seat track position vs. the sensor output voltage for a system 100 including linear Hall sensor set to operate in the range of 0.5V to 4.5V. As shown, the sensor output signal is linear over its operating range to provide a discrete voltage level output for each position along a 10 inch seat track. For example, the sensor output voltage is about 1V when the seat is about at the 1.5" position on the track.

With reference again to FIG. 2, a sensor consistent with the invention may also include an end of travel ratchet feature. In the illustrated exemplary embodiment, this is accomplished by cantilevering the worm shaft 110 in the housing. One end 111 of the shaft may be disposed in a cup 115 formed in the housing, and a bushing 117 may be placed between the worm wheel 108 and the cup 115 to facilliate rotation of the worm wheel 108 and shaft 110. The other end 123, however, may be disposed in a shaft opening 121 in the side of the housing that is larger than the diameter of the shaft 110.

As the seat moves down the track, the shaft 110 may rotate with the end 123 of the shaft riding on or adjacent to a top of the shaft opening 121. However, when the seat reaches its end of travel, the shaft 110 flexes downward toward the bottom of the shaft opening 121. This results in corresponding movement of worm gear 112, and allows the disengagement of the teeth between the worm gear 112 and final reduction gear, e.g. the sector gear 114. When a tooth has been passed over, the cantilever spring action of this shaft 110 will snap the gears back into engagement. To facilitate flex of the shaft in this configuration, the shaft 110 may be configured of a rigid but flexible material. A variety of such materials may be known to those skilled in the art. In one embodiment, for example, the shaft may be formed from a plastic such as nylon.

This end of travel ratchet feature has several advantages. For example, it prevents damage to the sensor if the motor should continue to turn after the final gear has reached the end of its required rotation. Also, it assists in the calibration of the sensor during manufacturing and during service of the vehicle. It also may also be used to synchronize the output signal with the proper seat position assembly and service of the vehicle.

Upon initial installation of a sensor consistent with the invention into a seat driving mechanism, the sensor must be synchronized to the actual location of the seat on the seat's track. A variety of methods of synchronizing the sensor are possible. In an embodiment including an end of travel ratchet feature as shown in FIG. 2, however, the slip of gear teeth between gears, e.g. the worm 112 and sector 114 gears, prevents further rotation of the sector gear at the both ends of the seat travel if the sensor is not synchronized with the actual position of the seat. This slipping action can be used to effectively calibrate the sensor to the seat track position.

In particular, the sensor system may be configured such that it will not produce an "in normal limits" signal unless the seat has been driven to both slip positions during installation. This effectively provides an electromagnetic lockout until calibration has been accomplished. In one embodiment, this feature is implemented electronically by the use of a two bit non-volatile memory device that would be programmed when both output limits (e.g. 0.5 V and 4.5 V) of the sensor have been achieved during installation. When both bits are programmed, the sensor would be calibrated and enabled.

Figure 7:
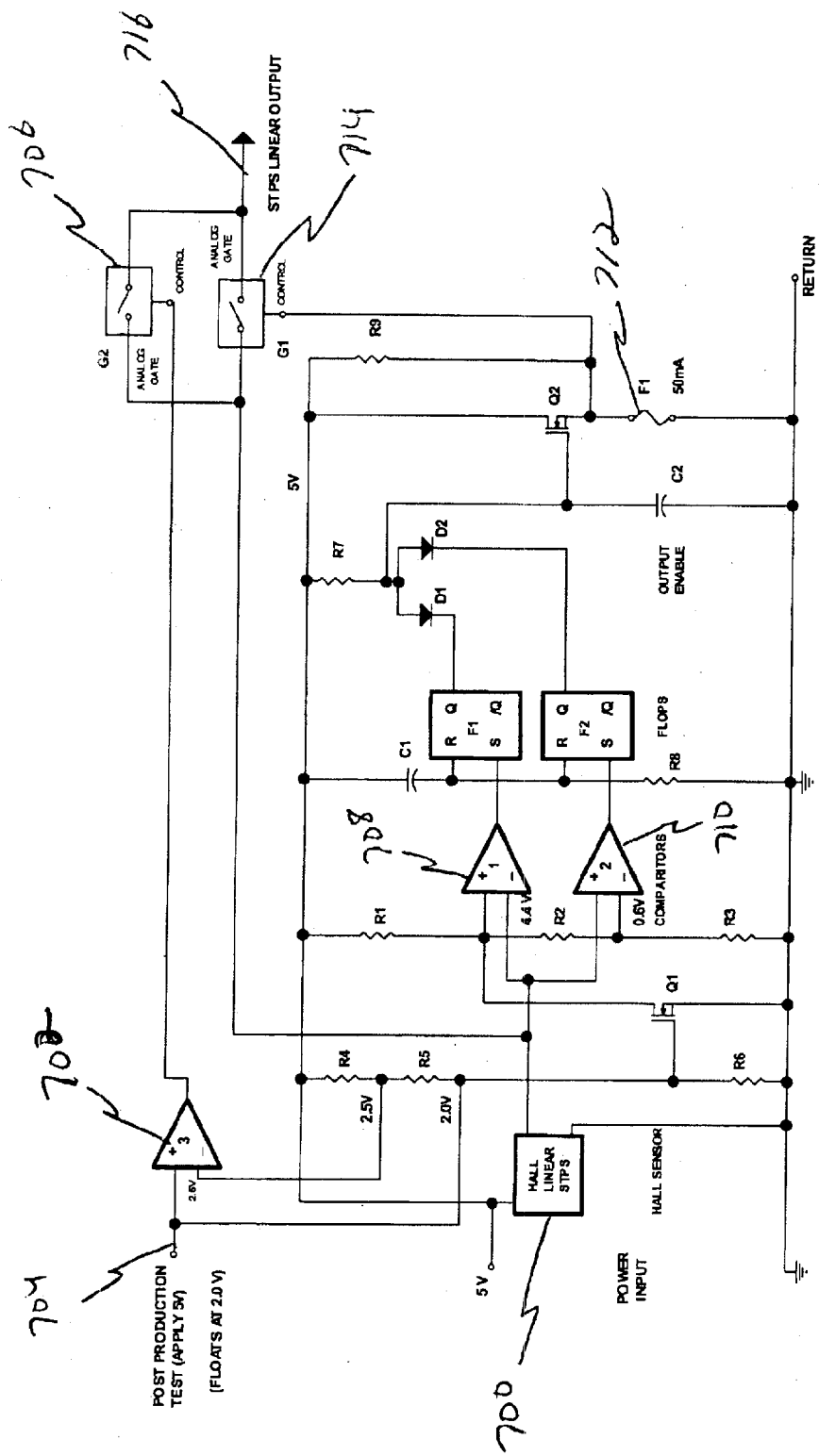
FIG. 7 is a circuit diagram for an exemplary embodiment of a sensor calibration circuit for a sensor consistent with the invention.

Other circuit configurations for facilitating sensor calibration are possible. One exemplary calibration circuit is illustrated in FIG. 7. Each of the components of the circuit may be installed and interconnected on the PCB 122 in a manner known to those skilled in the art.

In the illustrated embodiment, the output voltage range of the linear Hall sensor 700 may be set to 0.5 to 4.5V corresponding to a 10" range of seat movement. There are two basic modes of operation for the illustrated calibration circuit. For installation of the sensor, an installation calibration mode is initiated by grounding the positive input 704 of comparator 702. This inhibits operation of an analog gate 706, and enables the inputs to comparators 708 and 710 by turning transistor Q2 off. When power is first applied, flip-flops F1 and F2 are reset to low states by the high pass filter consisting of C1 and R8. This forces the gate of Q2 low, turning Q2 off. The capacitor C2 prevents momentary spikes from turning Q2 on.

In this installation mode, the seat must be driven to both extremes of its travel on its associated track to ensure calibration of the seat position to the sensor output. Comparator 708 detects when the sensor output exceeds 4.4 V, the forward extreme position, and sets F1 high. Comparator 710 detects when the sensor output falls below 0.6V, the rearward extreme, and sets F2 high. With both F1 and F2 in a high state, the gate of Q2 is pulled high by R7, turning on Q2 and blowing the fuse 712. With fuse 712 open, the control of analog gate 714 is pulled high by R9, allowing the sensor output to appear at the output 716. The sensor is then ready for service operation. Once the fuse 712 is blown, the comparator outputs no longer have any effect on circuit operation.

A post-production test mode is initiated by bringing the positive terminal of the comparator 702 to 5V. This allows the output of the sensor to appear at the output 716 via analog gate 706, while inhibiting the input to comparators 708 and 710. Finally, if the input to comparator 702 is left open, it will float at 2.0V and inhibit the operation of both output analog gates 706 and 714. This provides a safety feature to prevent enabling of the output in the absence of an input to comparator 3.

To avoid improper calibration failure on replacement of the sensor system, e.g. placing the same sensor into service after its removal, the system may be configured to be mechanically non-replaceable after removal. This can be accomplished in a variety of ways. In one embodiment, motor drive shaft may be a flexible metal cable that passes through the square hole in the drive pinion. This configuration would prevent the cable from being re-inserted into the sensor.

Another lockout approach is to provide a mechanical lockout gate that is enabled with the first placement of the motor output shaft into the sensor and is tipped or activated with the removal of the shaft. In one embodiment, a magnetically actuated part may be provided for blocking re-entry of the shaft into either the pinion or the system housing. In another embodiment a spring loaded pin or flap may be configured to closes the access hole in the drive pinion. This may be embodied as a wholly or partially molded in feature in the drive pinion or the sensor housing, and can be configured for linear or rotary operation.

Figure 8:
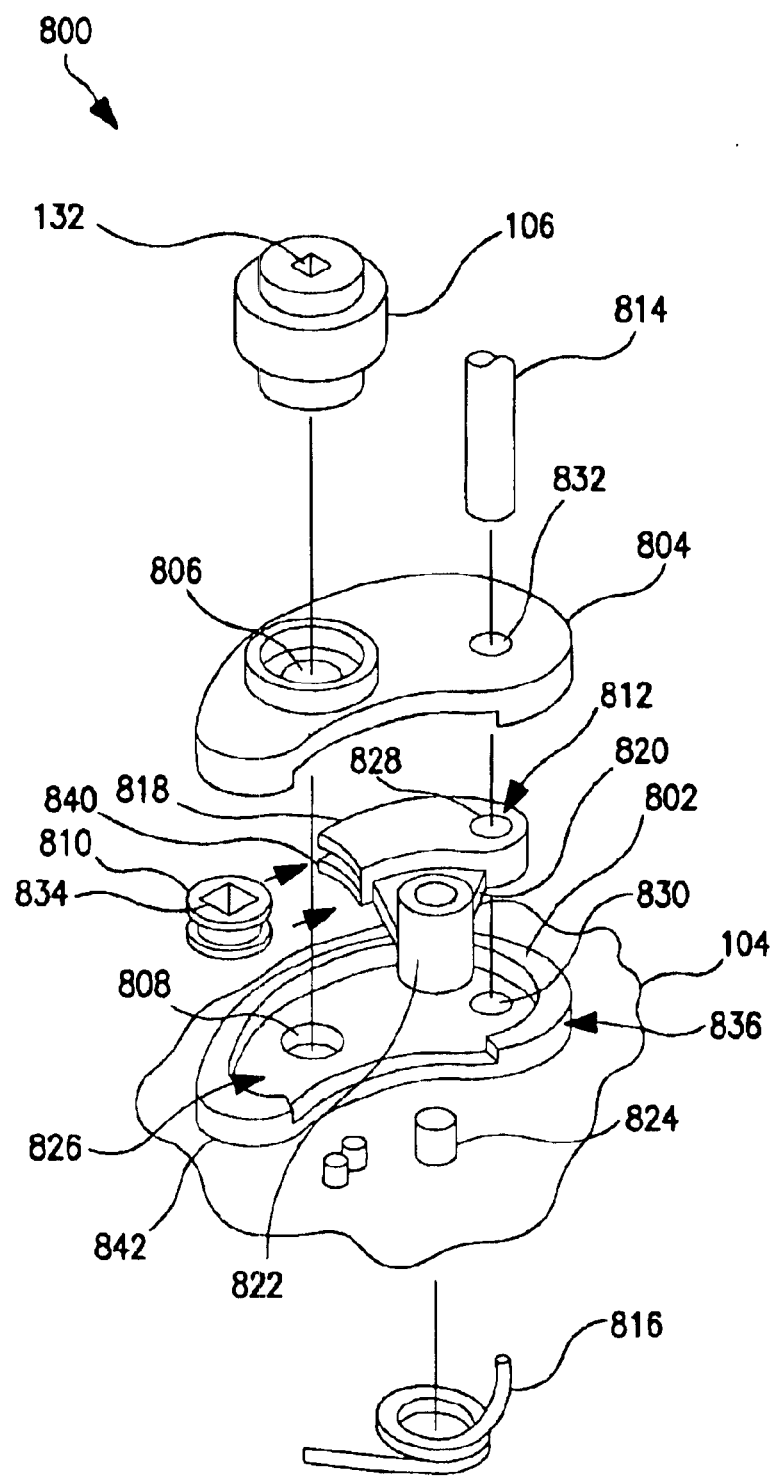
FIG. 8 is an exploded view of an exemplary mechanical lock-out mechanism consistent with the invention.

One embodiment of a rotary-type mechanical lockout assembly 800 is illustrated in exploded view in FIG. 8. The assembly 800 includes a housing including a casing 802 and a cover 804. The top of the cover 804 may include a cup for receiving the pinion gear 106 and supporting the pinion gear for rotation in the system 100. The housing may thus be positioned on the bottom of the casing 104 of the sensor system 100 so that openings 808, 806 in the casing 802 and cover 804 axially align with the opening 132 in the pinion gear 106 and the openings 130, 134 in the system housing and cover.

The assembly 800 may also include a square drive bushing 810, a lock-out arm 812, a grenade pin 814, and a torsion spring 816. The lockout arm may include a generally arcuate portion 818 affixed to a post 822 by an extension arm 820. The post 822 may be of a hollow cylindrical configuration to fit over and rotate around a pivot 824 protruding from the bottom of the casing 104. The housing of the assembly 800 may define a track 826 for receiving the arcuate portion 818 of the lockout arm. The lockout arm may be biased to rotate in the direction of the opening 808 by the torsion spring 816. A grenade pin opening 828 may be provided in an end of the arcuate portion 818 distal from the opening 808. The grenade pin opening 828 may be positioned so that it may be moved, against the bias of the torsion spring, into axial alignment with corresponding grenade pin openings 830, 832 in the casing 802 and cover 804.

The square drive bushing is dimensioned to fit in the track 826, and includes an opening 834 therein. When the lock out arm is moved, against the bias of the torsion spring 816, the opening 834 in the bushing 810 may be axially aligned with the openings 806, 808 in the housing, with the opening 132 in the pinion gear 106, and the openings 130, 134 in the system housing and cover. The motor shaft may thus be passed through the system housing and through the pinion gear 106, the cover 804, the bushing 810 and the casing 802.

A sensor assembly 100 including a lockout assembly 800 may be installed in a vehicle with the grenade pin 814 installed through grenade pin openings 828, 830 and 832. With the pin 814 in this position, the lockout arm is restrained by the pin at the end 836 against the bias of the torsion spring and does not apply any force to the bushing 810. Calibration of the sensor may be achieved with the grenade pin installed.

Once calibration is complete, the grenade pin may be removed and the seat may be installed. In this position a bushing interface portion 840 of the lockout arm is biased against the bushing by the torsion spring. In the illustrated exemplary embodiment, the bushing isolates the square drive motor shaft from direct contact with the lockout arm which would result in rough operation. In an embodiment including a cylindrical drive shaft, a bushing 110 may not be necessary.

When the sensor is removed from the vehicle, the drive shaft is forced out of the sensor. When the drive shaft exits the bushing, the torsion spring forces the bushing toward the end 842 of the housing and closes off the opening 808. With the lock-out arm in this position, the sensor cannot be reinstalled into the vehicle, thereby preventing inadvertent operation in an un-calibrated state.

There is thus provided a non-contact absolute position sensor. Advantageously, the sensor includes a non-contact Hall Effect sensing configuration, and connects directly between the seat track drive motor and the seat drive screw. The output of the sensor is inhibited until the sensor is calibrated to the seat position by an installation calibration sequence. Post-production testing is facilitated, and reinstallation of a removed sensor is inhibited to prevent inadvertent operation in an uncalibrated state.

It is to be understood that the embodiments that have been described herein are but some of the several which utilize this invention and are set forth here by way of illustration, but not of limitation. It is obvious that many other embodiments, which will be readily apparent to those skilled in the art may be made without departing materially from the spirit and scope of the invention as defined in the appended claims.

What is claimed is:

1. A position sensor comprising:
    a reduction gear train having an input gear and an output gear, said input gear being configured for coupling to an output shaft of a drive motor for driving a vehicle seat on an associated seat track, said output gear configured in said reduction gear train for rotation in response to rotation of said input gear, said rotation of said output gear being less than said rotation of said input gear in response to movement of said seat between an extreme fore and aft position on said track;
    a magnet disposed on said output gear for rotation therewith; and
    a linear Hall Effect sensor disposed adjacent the magnet for providing a sensor output signal in response to rotation of said magnet.

2. A position sensor according to claim 1, wherein said output gear is configured in said reduction gear train for rotation of less than 360 degrees in response to movement of said seat between said extreme fore and aft positions on said track.

3. A position sensor according to claim 1, wherein said input gear is comprises a pinion gear including an opening therethrough for receiving said drive shaft, said pinion gear being disposed for rotation with said drive shaft.

4. A position sensor according to claim 3, wherein said opening is comprises a square-drive opening.

5. A position sensor according to claim 1, wherein said reduction gear train further comprises a worm wheel in meshing engagement with said input gear, said worm wheel being disposed at an end of a worm shaft and a worm gear being disposed along said worm shaft, said worm gear being in meshing engagement with said output gear.

6. A position sensor according to claim 5, wherein said output gear is configured in said reduction gear train for rotation of less than 360 degrees in response to movement of said seat between said extreme fore and aft positions on said track.

7. A position sensor according to claim 5 wherein said output gear comprises a sector gear.

8. A position sensor according to claim 5, wherein said sensor further comprises a housing and a first end of said worm shaft is rotationally fixed to said housing, a second end of said housing being disposed in an opening having a dimension greater than a diameter of said worm shaft, said worm shaft thus being cantilevered in said housing to allow deflection of said second end of said worm shaft when said seat reaches a fore or aft extreme of its travel on said seat track, said deflection causing said worm gear to leave meshing engagement with said output gear.

9. A position sensor according to claim 1, said sensor further comprising a calibration circuit coupled to said linear Hall effect sensor, said calibration circuit being configured to inhibit operation of said sensor by inhibiting said sensor output signal until said seat is moved to said its extreme fore and aft positions by sensing a first output voltage condition of said linear Hall sensor in response to said seat moved to said extreme fore position and by sensing a second output voltage condition of said linear Hall sensor in response to said seat moved to said extreme aft position.

10. A position sensor according to claim 1, said sensor further comprising a housing defining axially aligned openings on opposite sides thereof, said openings being in axial alignment with an opening through said input gear for receiving said drive shaft.

11. A position sensor according to claim 1, said sensor further comprising a lock out mechanism, said mechanism comprising:
    a housing defining an opening for receiving said output shaft of said drive motor; and
    a lock out arm biased toward said opening, said lockout arm being configured to move over said opening upon removal of said output shaft from said opening, thereby preventing reinsertion of said output shaft into said opening.

12. A position sensor comprising:
    a reduction gear train having an input gear and an output gear, said input gear being configured for coupling to an output shaft of a drive motor for driving a vehicle seat on an associated seat track, said reduction near train further comprises a worm wheel in meshing engagement with said input gear, said worm wheel being disposed at an end of a worm shaft and a worm gear being disposed along said worm shaft, said worm gear being in meshing engagement with said output gear;
    a magnet disposed on said output gear for rotation therewith;
    a Hall Effect sensor disposed adjacent the magnet for providing a sensor output signal in response to rotation of said magnet; and
    a housing and a first end of said worm shaft is rotationally fixed to said housing, a second end of said housing being disposed in an opening having a dimension greater than a diameter of said worm shaft, said worm shaft thus being cantilevered in said housing to allow deflection of said second end of said worm shaft when said seat reaches a fore or aft extreme of its travel on said seat track, said deflection causing said worm gear to leave meshing engagement with said output gear.

13. A position sensor comprising:
    a reduction gear train having an input gear and an output gear, said input gear being configured for coupling to an output shaft of a drive motor for driving a vehicle seat on an associated seat track;
    a magnet disposed on said output gear for rotation therewith;
    a Hall Effect sensor disposed adjacent the magnet for providing a sensor output signal in response to rotation of said magnet; and
    lock out mechanism, said mechanism comprising:
    a housing defining an opening for receiving said output shaft of said drive motor; and
    a lock out arm biased toward said opening, said lockout arm being configured to move over said opening upon removal of said output shaft from said opening, thereby preventing reinsertion of said output shaft into said opening.

* * * * *

UNITED STATES PATENT AND TRADEMARK OFFICE
CERTIFICATE OF CORRECTION

PATENT NO. : 6,788,048 B2
DATED : September 7, 2004
INVENTOR(S) : Hedayat et al.

It is certified that error appears in the above-identified patent and that said Letters Patent is hereby corrected as shown below:

Column 7,
Line 24, after the word "gear", delete the word "is";
Line 28, after the word "opening" delete the word "is";
Line 56, after the word "said" delete the word "its";

Column 8,
Line 51, before the word "lock" insert the word -- a --.

Signed and Sealed this

Twenty-sixth Day of April, 2005

JON W. DUDAS
*Director of the United States Patent and Trademark Office*